United States Patent
Li et al.

(10) Patent No.: US 7,628,915 B2
(45) Date of Patent: Dec. 8, 2009

(54) METAL CYANO BONDED PHASES

(75) Inventors: Guang Qing Li, Foothill Ranch, CA (US); Yonglong Andrew Li, Santa Margarita, CA (US)

(73) Assignee: Varian, Inc., Palo Alto, CA (US)

( * ) Notice: Subject to any disclaimer, the term of this patent is extended or adjusted under 35 U.S.C. 154(b) by 192 days.

(21) Appl. No.: 11/635,901

(22) Filed: Dec. 8, 2006

(65) Prior Publication Data

US 2008/0135485 A1 Jun. 12, 2008

(51) Int. Cl.
*B01D 15/08* (2006.01)
*B01D 15/32* (2006.01)
*C02F 1/28* (2006.01)

(52) U.S. Cl. ............... 210/198.2; 210/656; 210/658

(58) Field of Classification Search .......... 210/656, 210/502.1; 502/400
See application file for complete search history.

(56) References Cited

U.S. PATENT DOCUMENTS

| | | | |
|---|---|---|---|
| 4,705,725 A | 11/1987 | Glajch et al. | |
| 5,075,371 A | 12/1991 | Boschetti et al. | |
| 5,234,991 A | 8/1993 | Tayot et al. | |
| 5,268,097 A | 12/1993 | Girot et al. | |
| 5,393,892 A | 2/1995 | Krakowiak et al. | |
| 5,441,643 A * | 8/1995 | Spears et al. | 210/635 |
| 5,990,039 A | 11/1999 | Paul et al. | |
| 6,441,164 B2 | 8/2002 | Sibert | |
| 6,524,480 B2 * | 2/2003 | Gjerde et al. | 210/635 |
| 7,125,488 B2 * | 10/2006 | Li | 210/198.2 |
| 2006/0027501 A1 * | 2/2006 | Andersson et al. | 210/656 |
| 2006/0131238 A1 | 6/2006 | Xu | |

FOREIGN PATENT DOCUMENTS

EP 475053 A1 * 3/1992

OTHER PUBLICATIONS

Rokita et al. "Salen-Metal Complexes". Small Molecule DNA & RNA Binders: From Synthesis to Nucleic Acid Complexes. vol. 1. (2003) p. 126-145.*
Dadfarnia et al. "Immobilized salen (N,N'-bis(salicylidene) ethylenediamine) as a complexing agent for on-line sorbent extraction/preconcentration and flow injection-flame atomoic absorption spectrometry". Analytica Chimica Acta. vol. 539 (2005) p. 69-75.*

(Continued)

*Primary Examiner*—Krishnan S Menon
*Assistant Examiner*—Katherine Zalasky
(74) *Attorney, Agent, or Firm*—Cynthia R. Moore; Bella Fishman

(57) ABSTRACT

A composition for use in chromatography is provided comprising a substrate modified with a metal-cyano bonded phase. This novel cyano bonded phase provides superior performance in high performance liquid chromatography (HPLC) and provides superior selectivity, improved peak shape for basic analytes, and the ability of provide rapid separation with outstanding resolution. The composition exhibits improved storage stability, and is chemically stable over a range of pH from 1.5 to 7.5 mobile phase conditions and for more than 2000 multiple injections. A baseline separation of eight tricyclic antidepressants was achieved in less than four minutes using an isocratic mobile phase with the metal-cyano bonded phase of the present invention, compared to the long retention times and poor separation observed for traditional cyano bonded phase. The composition of this invention is particularly useful in a wide variety of chromatographic applications.

16 Claims, 9 Drawing Sheets

Time (min)

OTHER PUBLICATIONS

Kurata et al. Chiral separation with novel (S)-biotin-bonded silica gel for liquid chromatography. Journal of Chromatography A, 1068 (2005) 335-337.*

Book by Neue, Uwe D., entitled "HPLC Columns: Theory, Technology and Practice", published by Wiley-VCH Inc., New York (1997), p. 164-183.

Book by Vansant, Ef et al., entitled "Characterization and Chemical Modification of the Silica Surface", published by Elsevier Science B.V., New York (1995), Preface, 2 pages.

Book by Scott, Raymond PW, entitled "Silica Gel and Bonded Phases", published John Wiley & Sons, New York (1993), Contents, 2 pages.

Article by Okusa, Kensuke, et al., entitled "Development of a New Cyano-Bonded Column for High-Performance Liquid Chromatography", published by J. Chromatogr A 869 (2000), pp. 143-149.

Article by O'Gara, John E. et al, entitled "Dependence of Cyano Bonded Phase Hydrolytic Stability on Ligan Structure and Solution pH", published by J. Chromatogr A 893 (2000), pp. 245-251.

Article by Jones, Robert D. et al., entitled "Synthetic Oxygen Carriers Related to Biological Systems", published by Chemical Reviews, 1979, vol. 70, No. 2, pp. 139-179.

Article by Mclendon, G. et al., entitled "Inorganic Oxygen Carriers as Models for Biological Systems", published by Coord. Chem. Rev., 19, pp. 1-39.

Article by Coleman, WM, et al, entitled "Oxygenation Studies of Manganese (II) Complexes Containing Linear Pentadentate Ligands", published by Inorganic Chemistry, vol. 16, No. 5, 1977, pp. 1114-1119.

Article by Busch, Daryle H., et al., entitled "Steric Control of CO Binding in a Totally Synthetic Heme Protein Model", published by Proc. Natl. Acad. Sci. USA, vol. 78, No. 10, pp. 5919-5923, Oct. 1981.

Article by Herron, Norman et al., entitled "Reverisble Dioxygen Binding by a Totally Synthetic Non-Porphyrin Macrobicyclic Iron(II) Complex Containing a Persistent Void", published by J.Am. Chem.Soc. 1981, 103, pp. 1236-1237.

Article by Baldwin, JE. et al., entitled "Binding of Dioxygen to Iron(II): Reversible Behavior in Solution" published by J. Am. Chem. Soc., 95, Aug. 1973, pp. 5757-5759.

* cited by examiner where X = 5-Cl, 5-Br, 3-CH$_3$O, 5-NO$_2$; M= a metal atom; and
R = H, CH$_3$, n-C$_3$H$_7$, C$_6$H$_5$ where M = a metal atom; $R^1$ = m-xylyl; $R^2$ and $R^3$ = $CH_3$; X = $(CH_2)_3$

METAL CYANO BONDED PHASES

FIELD OF THE INVENTION

This invention relates generally to compositions useful in chromatographic separations.

BACKGROUND OF THE INVENTION

The preparation of bonded phases to be used as the stationary phase for chromatographic applications has been widely studied. Silanes are the most commonly used surface modifying reagents to prepare bonded phases in liquid chromatography. The chemistry of silanes with various surfaces is well studied. A general discussion of the reaction of silanes with the surface of silicaceous chromatographic support materials is provided in *HPLC Columns: Theory, Technology, and Practice*, U. D. Neue, Wiley-VCH, Inc., New York (1997). Additional details on the reaction of silanes with porous silicas are disclosed in *Characterization and Chemical Modification of the Silica Surface*, E. F. Vansant, et al., Elsevier Science B. V. New York (1995). A broad description of the reactions of silanes with a variety of materials is given in *Silica Gel and Bonded Phases, Their Production, Properties and Use in LC*, R. P. W. Scott, John Wiley & Sons, New York (1993).

There are numerous improvements in the art of bonded phases. These improvements are aimed at producing specialized phases useful in normal phase chromatography, for separating polar analytes, or reverse phase chromatography for separating nonpolar analytes, solving problems relating to stability in high or low pH mobile phase conditions, providing phases that are useful under normal phase as well as reversed phase mobile phase conditions. Other problems stem from difficulties in creating bonded phases that provide for reduced residual silanol residues, and further, that do not exhibit hydrolysis of the bonded phase. Some investigators have approached the latter problem by including bulky substituents on the silane to provide steric protection against hydrolysis for the bonded phase. For example, U.S. Pat. No. 4,705,725 to Glajch describes bonding a monofunctional silane to a substrate wherein the silane contains at least two sterically-protecting groups attached to the silicon atom of the silane.

Specialized phases have been produced for both reversed phase and normal phase chromatography. For normal phase chromatography, silica has been coated with salts of heavy metals to produce a silica having unique selectivities for analytes that form complexes with the metal ions. For example, silver has been coated onto silica to be utilized in argentation chromatography. (See, U. D. Neue, *HPLC Columns, Theory, Technology, and Practice*, Wiley-VCH, New York, 1997, Chapter 9, page 164-182). In addition, silica supports impregnated with transition metals are known in the catalyst art for treatment of the products of combustion (See, e.g., U.S. Pat. No. 5,990,039 to Paul, et al.).

U.S. Pat. No. 5,393,892 to Krakowiak, et al. describes the selective removal of alkali, alkaline earth metal, Pb and Tl cations from complex matrices containing these ions by means of a crown ether covalently bonded through a spacer to a support material consisting of sand, silica gel, glass, glass fibers, alumina, nickel oxide, zirconia or titania. However, this patent does not concern phases for chromatographies. The material was used for the removal of alkali, alkaline earth metal, Pb and Tl cations, and not for analytical or chromatographic purposes.

Useful bonded phases for use in both normal and reverse phase chromatography include the use of the polar cyano functionality, and cyanopropyl bonded phase columns have been widely applied in the separation of analytes. For example, Okusa, K., et al. (2000) *J Chromatogr.* 869, 143-149 described a cyanopropyl bonded column used to separate polar compounds from biological samples. The column reportedly showed specific selectivity and suitability for use in both normal and reversed phase high performance liquid chromatography (HPLC). Okusa, et al. reported that both the separating selectivity and durability of the cyanopropyl bonded phase are dependent on the preparation conditions, and that the irreversible adsorption of compounds is related to the density of cyanopropyl groups on the silica support. Non-endcapped bonded phases were reported to inhibit adsorption of basic compounds when a high loading of cyanopropyl groups was utilized.

Although cyano columns are commercially available and have a number of advantages, their use is not very widespread due to the problems of poor chemical and mechanical stability (see Okusa, et al. and U. D. Neue, *HPLC Columns, Theory, Technology, and Practice*, Wiley-VCH, New York, 1997, Chapter 9, page 164-182). For example, cyano columns typically are ascribed poor retention time stability in low pH mobile phases due to acid induced ligand hydrolysis from the silica support. In addition, stability in high pH mobile phases can suffer due to dissolution of the silica skeleton, where the short chain ligand provides little protection. In both these instances, there is a change in the chromatographic profile (J. E. O'Gara, J. E., et al. (2000) *J Chromatogr.* 893, 245-251). Frequently the pH must be maintained at a prescribed level, or the column undergoes irreversible damage and loses its efficiency and characteristics, such as the ability to produce narrow peaks, desirable retention volumes or resolve components of a mixture. This damage can occur even if the accidental use outside the narrow pH range defined for the column is only for a short period of time.

Another deficiency reported for cyanopropyl columns is their tendency to exhibit phase collapse in solvents of intermediate polarity. The instability is mechanical in nature, not chemical, in which the packed bed collapses into a more dense state. The collapse phenomenon is akin to the events that occur when a bucket full of wet beach sand is tapped from the side, the sand settles, and water rises to the surface (see U. D. Neue, *HPLC Columns, Theory, Technology, and Practice*, Wiley-VCH, New York, 1997, Chapter 9, page 164-182.). In both nonpolar and polar solvents, this catastrophic collapse is prevented by the adhesion of particles to each other. In solvents of intermediate polarity, this adhesion vanishes and bed collapse can occur.

Another disadvantage of cyano bonded phase relates to polar interactions with analytes. It is unclear how much of the polar interaction of this packing is due to the cyano functional group and how much is due to residual silanols. Most likely, both participate in the retention of analytes. Detailed studies of the retention mechanism of this bonded phase are not available.

One attempt to solve the problem of polar interactions has been to introduce a bulkier substituent on the silicon atom of the silane reagent in place of the methyl groups, as described in U.S. Pat. No. 4,705,725 to Glajch, et al. This patent discloses that a (3-cyanopropyl)diisopropylsiloxane bonded phase has improved hydrolytic stability, which is apparently due to steric protection of the siloxane bond by the large isopropyl side groups.

However, there remains a need in the art to provide a stable and reproducible cyano bonded phase suitable for chromatographic separations. There is a further need in the art to provide a cyano bonded phase that is not susceptible to phase collapse. There is an additional need in the art to provide a cyano bonded phase that resists hydrolysis in base or acid conditions. There is a further need in the art to provide a cyano bonded phase that can provide superior and rapid separations between basic compounds.

SUMMARY OF THE INVENTION

These and other deficiencies in the art are addressed by the metal cyano bonded phases of the present invention.

Accordingly, it is a primary object of the invention to provide a stable and reproducible cyano bonded phase suitable for chromatographic separations.

It is a further object of the invention to provide a cyano bonded phase that is not susceptible to phase collapse.

It is an additional object of the invention to provide a cyano bonded phase that resists hydrolysis in base or acid conditions.

It is a further object of the invention to provide a cyano bonded phase that can provide superior and rapid separations between basic compounds.

Accordingly, in one aspect, there is provided a composition for use in chromatography comprising a substrate modified with a metal cyano bonded phase. Preferably, the metal cyano bonded phase comprises a metal complex comprising a metal selected from a transition metal, an actinide or a lanthanide and at least one polydentate ligand or monodentate ligand, or combinations thereof. Preferably, the transition metal is selected from Cu, Co, Fe, Mn, Cr, Ni, Zn, or Ti, or combinations thereof. The polydentate ligand is preferably selected from a Schiff base, or macrocyclic ligand such as phthalocyanin, crown ether, lacunar ligand, porphyrin, or nitrogen-containing nonporphyrin ligand. In a preferred embodiment, the Schiff base is bis(salicylidene)-ethylenediamine.

In certain embodiments, the substrate is an inorganic substrate or an organic substrate, or mixtures or composites thereof. The inorganic substrate can comprise a metal or metalloid oxide, or mixtures or composites thereof. Preferably, the metal or metalloid oxide is selected from silica, alumina, zeolite, mullite, zirconia, vanadia or titania, or mixtures or composites thereof. In a particularly preferred embodiment, the inorganic substrate is silica.

Generally, the metal-cyano bonded phase can comprise a cyanohydrocarbyl moiety comprising a $C_{1-100}$ straight or branched chain hydrocarbyl, including cycloalkyl, cycloalkylalkyl, or heterocycloalkyl substituted with cyano, and optionally further substituted with $C_1$-$C_{20}$ hydrocarbyl, hydroxyl, alkoxy, halogen, amino, or carbonyl. Preferably, the cyano substitution is provided distal from the substrate surface, near the interfacial region of mobile phase and the bonded phase. In a preferred embodiment, the cyano substitution is at the end of the hydrocarbyl, cycloalkyl, cycloalkylalkyl, or heterocycloalkyl and able to act as a ligand. In a particularly preferred embodiment, the metal-cyano bonded phase comprises a cyanohydrocarbyl moiety having the formula NC—$(CH_2)_\beta SiR_\alpha$, wherein R is a $C_1$-$C_{20}$ hydrocarbyl, $\alpha$ is 0-2, and $\beta$ is 1-100.

In another aspect, there is provided a method for preparing a substrate modified with a metal-cyano bonded phase comprising: providing a substrate modified with a cyano bonded phase; and contacting the cyano bonded phase with a metal complex to provide a metal-cyano bonded phase. The substrate modified with a cyano bonded phase can be provided by purchasing (or otherwise obtaining) cyano bonded phase, or can comprise the initial step of modifying a substrate to provide a cyano bonded phase. Thus, in certain embodiments, the method comprises: modifying a substrate to provide a cyano bonded phase, and contacting the cyano bonded phase with a metal complex to provide a metal-cyano bonded phase. In particular embodiments, the substrate is an inorganic substrate, or an organic substrate, or mixtures or composites thereof. The inorganic substrate comprises a metal or metalloid oxide, or mixtures or composites thereof, selected from silica, alumina, zeolite, mullite, zirconia, vanadia or titania, or mixtures or composites thereof.

In certain preferred embodiments, the inorganic substrate is modified with a cyanosilane to provide a cyano bonded phase The method can further comprise modifying the cyano bonded phase with an endcapping silane prior to contacting the cyano bonded phase with a metal complex. In a preferred embodiment, the cyanosilane has the formula NC—$(CH_2)_\beta SiR_\alpha X_{(3-\alpha)}$, wherein R is a $C_1$-$C_{20}$ hydrocarbyl, $\alpha$ is 0-2, $\beta$ is 1-100, and X is a leaving group, for example, Cl, Br, I, OH, alkoxy, acyloxy, and the like. In a particularly preferred embodiment, the cyanosilane is 3-cyanopropyldimethyl chlorosilane.

In one embodiment, the metal complex comprises a metal and at least one polydentate ligand or monodentate ligand, or combinations thereof. Preferably, the metal is selected from a transition metal, an actinide or a lanthanide. Preferably, the transition metal is selected from Cu, Co, Fe, Mn, Cr, Ni, Zn, or Ti, or combinations thereof. The polydentate ligand can be, but is not limited to, a Schiff base or a macrocyclic ligand, such as a phthalocyanin, crown ether, lacunar ligand, porphyrin, or nitrogen-containing nonporphyrin ligand, or the like. In a preferred embodiment, the metal complex comprises Co and a Schiff base, preferably bis(salicylidene)-ethylenediamine.

In an additional aspect, there is provided a method for separating a plurality of analytes, comprising performing a chromatographic separation using a stationary phase comprising a substrate modified with a metal cyano bonded phase. In certain embodiments, the substrate is an inorganic substrate. In additional embodiments, the substrate is an organic substrate, or a mixture or composite of an inorganic substrate and an organic substrate. Preferably the inorganic substrate comprises a metal or metalloid oxide, or mixtures or composites thereof. In a preferred embodiment, the metal or metalloid oxide is selected from silica, alumina, zeolite, mullite, zirconia, vanadia or titania, or mixtures or composites thereof. The chromatographic separation can be, but is not limited to, thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography mass spectrometry, gas chromatography, microfluidics based separations, solid phase extraction separations, or monolith based separations.

In an additional aspect, there is provided a chromatography column, wherein the stationary phase comprises a substrate modified with a metal-cyano bonded phase.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

I. Definitions and Overview

Figure 1:
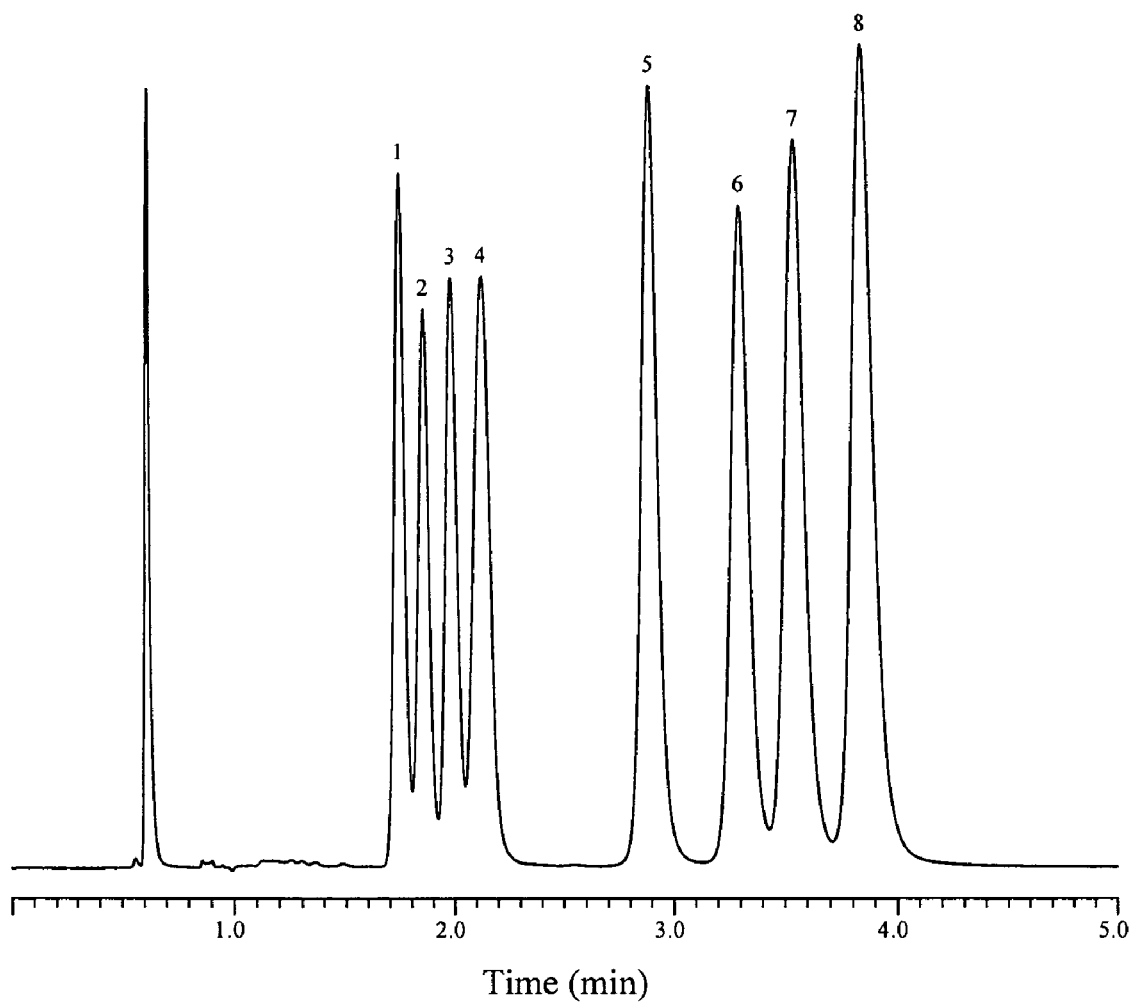
FIG. 1 illustrates a typical liquid chromatogram obtained using a metal-cyano bonded phase.

Before the present invention is described in detail, it is to be understood that unless otherwise indicated this invention is not limited to specific cyano ligands, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a solvent" includes two or more solvents; reference to "an analyte" includes two or more analytes, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

As used herein, the terms "asymmetry" or "peak asymmetry" refer to a factor describing the shapes of chromatographic peaks, defined as the ratio of the distance between the peak apex and the back side of the chromatographic curve and the front side of the curve at 10% peak height.

The term "cyano" has its generally accepted meaning in chemistry, relating to the NC-radical. When used in the context of a metal cyano bonded phase, the term "cyano" refers generally to cyanoalkyl moieties, typically straight chain or branched aliphatic, although the term also encompasses cyanocycloalkyl, cyanoalkenyl or cyanoalkynyl moieties.

The term "hydrocarbyl" refers generally to alkyl moieties, including straight or branched chain or cyclic moieties such as cycloalkyl, cycloalkenyl or cycloalkylalkyl, and the like, and also encompasses alkenyl or alkynyl moieties.

The term "retention factor" is defined in terms of the measured parameters $t_R$ and $t_0$, where $t_R$ is the retention time of the measured peak, and $t_0$ is retention time of the non-retained component. The retention factor can be calculated from the formula $k=(t_R-t_0)/t_0$.

The present invention provides unique metal cyano bonded phases that are useful for performing chromatographic separations, among other uses. Without being bound by theory, it is believed that a cyano bonded phase can be stabilized by coordination of the CN group to a metal such as a transition metal, forming a metal-cyano complex. For example, in coenzyme $B_{12}$, cobalt forms weak (~20-30 kcal/mole) covalent bonds to carbon leading to relatively stable organocobalt compounds. In particular, cyanocobalt bonded phases are shown herein to effect a stable bonded phase that overcomes the problems of the prior art cyano bonded phases. Specifically the metal cyano bonded phases resist phase collapse, are stable to extremes of base and acid, exhibit unique selectivity, rapid separation capabilities, outstanding resolution for basic analytes, improved storage stability, and excellent stability at a pH between 1.5 and 7.5 mobile phase conditions. The metal cyano bonded phases permit highly superior chromatographic separations by HPLC, reversed and normal phase chromatography, ion exchange chromatography, size exclusion chromatography, hydrophobic interaction chromatography and affinity chromatography, among others. The bonded phases can also be used in polymer and monolith based solid phase extraction products.

II. Metal Cyano Bonded Phases

The metal cyano bonded phase can comprise a cyanohydrocarbyl moiety comprising a $C_{1-100}$ straight or branched chain hydrocarbyl, including cycloalkyl, cycloalkylalkyl, or heterocycloalkyl substituted with at least one cyano moiety, and optionally further substituted with $C_1$-$C_{20}$ hydrocarbyl, hydroxyl, alkoxy, halogen, amino, or carbonyl. Preferably, the cyano substitution is provided distal from the substrate surface, near the interfacial region of mobile phase and the bonded phase. In a preferred embodiment, the cyano substitution is at the end of the hydrocarbyl, cycloalkyl, cycloalkylalkyl, or heterocycloalkyl and able to act as a ligand for the metal. In a particularly preferred embodiment, the metal cyano bonded phase comprises a cyanohydrocarbyl moiety having the formula $NC-(CH_2)_\beta SiR_\alpha$, wherein R is a $C_1$-$C_{20}$ hydrocarbyl, $\alpha$ is 0-2, and $\beta$ is 1-100.

The metal cyano bonded phase also comprises a metal complex comprising a metal and at least one polydentate ligand or monodentate ligand, or combinations thereof. Metal complexes can exhibit both $\sigma$-$\pi$ coordinated bonding and anti coordinated bonding to balance electron density. Complexes must have at least one metal coordination site available for cyano coordination from the cyano bonded phase. Preferably, the metal is selected from a transition metal, an actinide or a lanthanide. In certain preferred embodiments, the transition metal is selected from Cu, Co, Fe, Mn, Cr, Ni, Zn, or Ti, or combinations thereof.

The term "polydentate ligand" refers to a ligand that is coordinated to a metal atom through more than one donor atom. Similarly, a monodentate ligand is a ligand that is coordinated to a metal atom through only one donor atom. Polydentate ligands include macrocyclic ligands, linear or cyclic peptides such as antibiotics, synthetic or semi-synthetic compounds such as ethylenediamine tetraacetic acid (EDTA) or bipyridine. An exemplary species of polydentate ligand is bis-(salicylidene)-ethylenediamine.

The term "macrocyclic ligand" refers to a class of polydentate ligands containing donor (hetero) atoms (e.g., O, S, N or NH), incorporated in or attached to a cyclic backbone. The macrocyclic ligand can comprise repeating units of carbon atoms and hetero atoms separated by the carbon atoms (generally by at least two or three carbon atoms). Macrocyclic ligands exhibit a conformation having a cavity capable of coordinating to a metal with the electrons of the hetero atom (e.g., a lone pair of electrons on the oxygen atoms when the hetero atoms are oxygen). Most macrocyclic ligands contain at least three donor heteroatoms, with a minimum of nine atoms in the ring. In general, the macrocyclic ring contains at least 9, more preferably 12 to 14, and up to 24 or more carbon atoms and hetero atoms (e.g., O, S, N, NH, etc.). The macrocyclic ligand can comprise multiple rings containing four to seven atoms in each ring. The macrocyclic ring may be substituted or unsubstituted, and may be fused to additional rings (e.g., 1 to 4 additional rings such as phenylene, naphthylene, phenanthrylene, and anthrylene rings). Macrocyclic ligands include phthalocyanins, crown ethers (including Wurster's crown ligands), cryptates, cryptands, lacunar ligands, porphyrins (including synthetic porphyrins such as "picket fence" porphyrins, "tailed" porphyrins, "tailed picket fence" porphyrins, "capped" porphyrins, "pocket" porphyrins, "tailed pocket" porphyrins, "strapped" porphyrins, "bridged" porphyrins, "crowned" porphyrins, "cofacial" diporphyrins) and related compounds such as corrins, chlorins, porphyrinogens, as well as nitrogen-containing nonporphyrins, and the like. Macrocyclic ligands can also include Schiff bases. "Crown ethers" in particular include macrocyclic polyethers whose structure exhibits a conformation with a cavity capable of coordinating to a metal with lone pairs of electrons on the oxygen atoms, and containing repeating $(OCH_2CH_2)_n$ units (Penguin Dictionary of Chemistry (2nd ed. 1990)). Crown ethers are a species of macrocyclic ligand. Wurster's crown ligands (e.g., such as those described in U.S. Pat. No. 6,441,164 to Silbert) typically comprise a macrocyclic ligand such as a crown ether in which a hetero atom is substituted with a 1,4-phenylenediamine group. The phenylenediamine group is covalently bound to the macrocyclic ligand by one or both of the amine nitrogens, the amine nitrogen thereby substituting for the hetero atom of the macrocyclic ligand.

Figure 6:
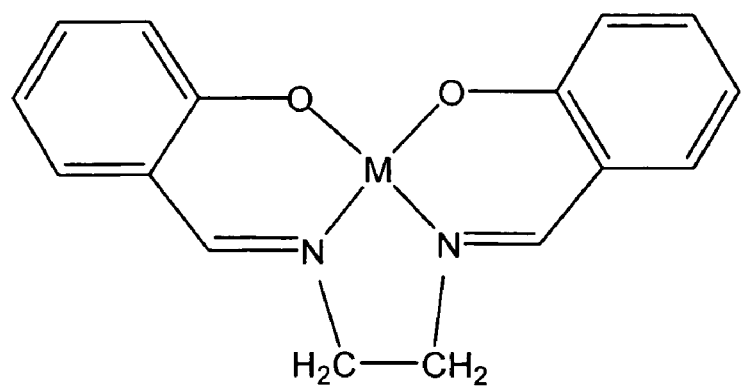
FIG. 6 illustrates examples of tetradentate and pentadentate Schiff base ligands.
Figure 6:
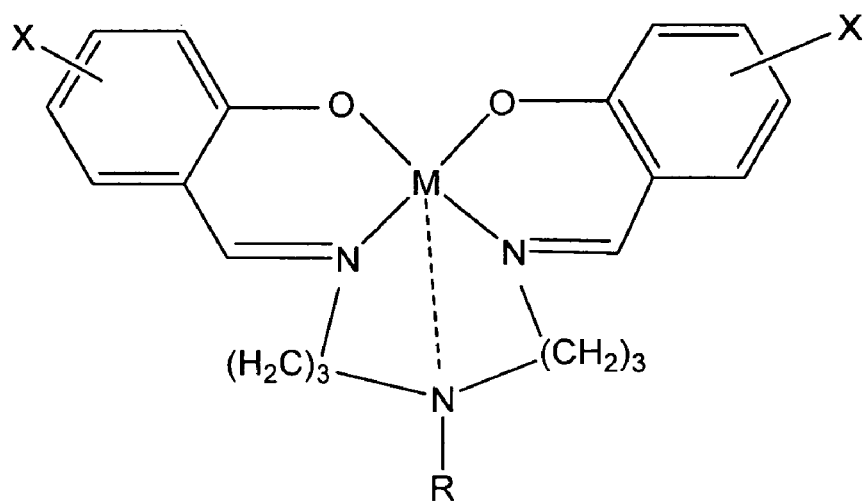

Schiff bases are planar chelating ligands or macrocyclic ligands formed by condensing a primary amine with a compound bearing a carbonyl group. Schiff bases can include N and O-containing tetradentate or pentadenate ligands. Tetradentate Schiff base ligands typically comprise two O and two N atoms. Pentadentate Schiff base ligands typically comprise two O and three N atoms, or three O and two N atoms, or two O, one S and two N atoms. For example, tetradentate and pentadentate Schiff bases are shown in FIG. 6. For further discussion of Schiff bases, see R. D. Jones, D. A. Summerville, and F. Basolo (1979) *Chem. Rev.* 79, 139; G. McLendon and A. E. Martell (1976) *Coord. Chem. Rev.,* 19, 1; and W. M. Coleman and L. T. Taylor (1977) *Inorg. Chem.* 16, 1114. In a preferred embodiment, the Schiff base is bis(salicylidene)-ethylenediamine and the metal is cobalt.

Figure 7:
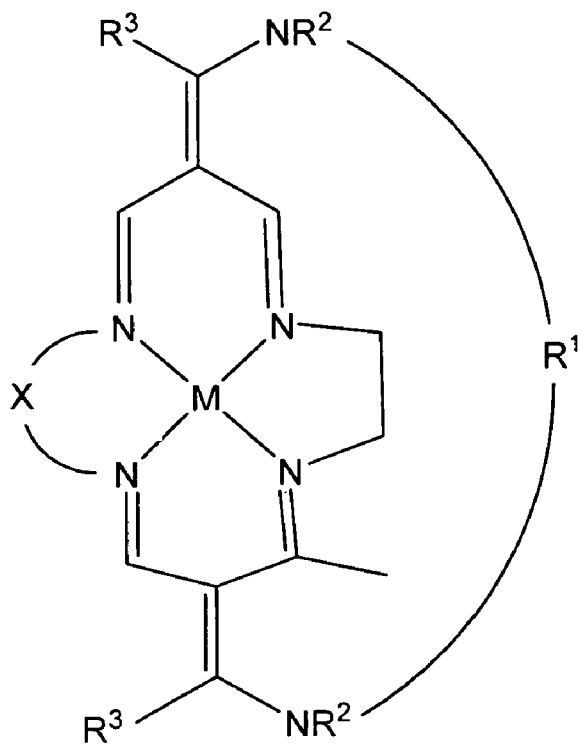
FIG. 7 illustrates typical structures for lacunar ligands.

Lacunar ligands include those neutral, bicyclic molecules having conformations that incorporate permanent voids in the vicinity of a metal coordinate site, such as described in Busch, D. H., et al. (1981) *Proc. Natl Acad. Sci. USA* 78, 5919, and N. Herron and D. H. Busch (1981) *J Am. Chem. Soc.* 103, 1236. Typical Lacunar ligands are described by compounds of the formula shown in FIG. 7. One such lacunar ligand is exemplified by, but not limited to, $M[(m-xylyl)(NHEthi)_2(CH_3)_2$ (16)tetraene-$N_4$]L, where M is a metal (e.g., Fe, Co, Ti, etc.) and L is the cyano ligand supplied upon coordination of the metal complex to the cyano bonded phase.

Figure 8:
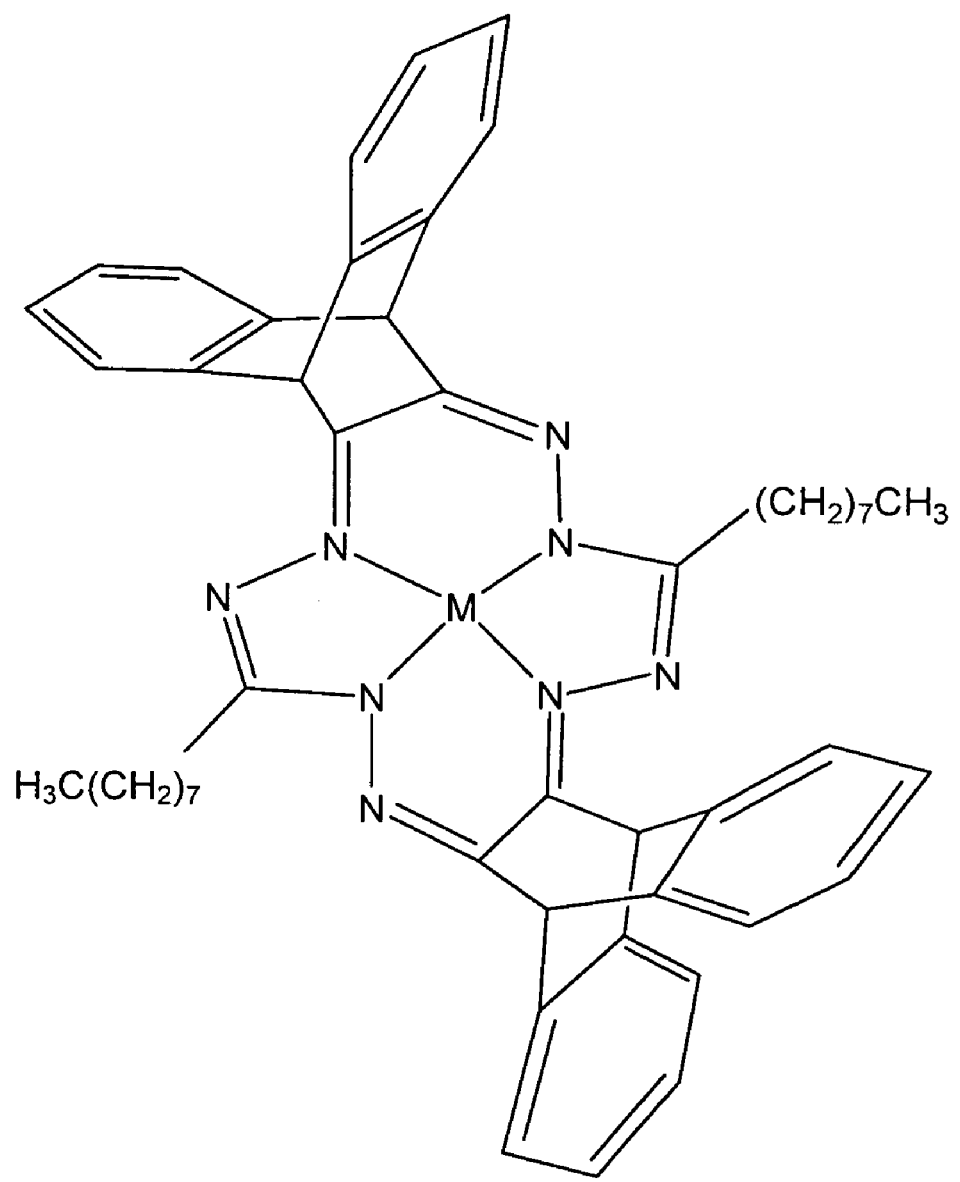
FIG. 8 illustrates a typical nitrogen-containing nonporphyrin ligand.

Nitrogen containing non-porphyrin ligands include synthetic 4N-containing macrocylic compounds, such as those described by J. E. Baldwin and J. Huff (1973) *J Am. Chem. Soc.* 95, 5757. A typical example is shown in FIG. 8.

III. Substrates

The substrates useful in the invention include inorganic substrates such as metal and metalloid oxides, including for example, titania, zirconia, vanadia, alumina, and silica respectively, or mixtures or composites thereof. Glasses comprising silica and silica composites are also useful. The substrates can also include composite materials such as mullite, zeolite, $CaTiO_3$ (perovskite), $FeTiO_3$ (ilmenite), $Mg_2TiO_4$ (spinel). Inorganic substrates include porous mineral materials, such as silica, alumina, titanium oxide, zirconium oxide and other metal oxides, or mixtures thereof. The inorganic substrate can be present in the form of particles or monoliths, etc., but can also be present as a coating or component of an additional inorganic or organic support material. In a particularly preferred embodiment, the inorganic substrate is silica gel.

Organic substrates include supporting materials may be composed of polysaccharides, such as cellulose, starch, dextran, agar or agarose, or hydrophilic synthetic polymers, such as substituted or unsubstituted polyacrylamides, polymethacrylamides, polyacrylates, polymethacrylates, polyvinyl hydrophilic polymers, polystyrene, polysulfone or the like.

Alternatively, composite or "hybrid" inorganic and organic materials may be used as solid support materials. Such composite materials may be formed by the copolymerization or formation of the organic support materials while in contact with an inorganic support material. Examples of suitable composite materials include polysaccharide-synthetic polymers and/or polysaccharide-mineral structures and/or synthetic polymer-mineral structures, such as are disclosed in U.S. Pat. Nos. 5,268,097, 5,234,991 and 5,075,371.

The substrate may take the form of beads or regular or irregular particles ranging in size from about 0.01 mm to 10 mm in diameter, fibers (hollow or otherwise) of any size, membranes, flat surfaces ranging in thickness, for example, from about 0.1 mm to about 10 mm thick, and sponge-like materials, such as frits with holes from a few microns to several mm in diameter.

Preferably, the inorganic substrate is a metal-oxide or metalloid oxide, such as silica, alumina, zeolite, mullite, zirconia, vanadia or titania, or mixtures or composites thereof, having reactive metal oxides capable of forming a cyano bonded phase, e.g., by reacting with a cyano substituted silane, such as an alkoxysilane, acyloxysilane, aminosilane, hydroxysilane or halosilane. After modification of the inorganic substrate surface with the cyanosilane, the silane is covalently attached to the inorganic substrate via an oxygen linkage and the cyano moiety is preferably accessible to the mobile phase.

In preferred embodiments, the inorganic substrate is in the form of a monolith or porous particles. Monoliths include glass fibers, optical fibers, capillaries, or nonporous particles, which may be continuous with the substrate surface. In one preferred embodiment, the inorganic substrate is an ultraporous sol gel monolith as described in commonly owned U.S. Patent Publication No. 2006/0131238 A1 to Xu. In another preferred embodiment, the inorganic substrate comprises silica gel particles having an average pore diameter from about 60 Å to about 1000 Å, and an average particle size from about sub 2 μm to about 60 μm. Preferably the porous particles have an average pore diameter from about 60 Å to about 1000 Å, and have an average particle size from about sub 2 μm to about 60 μm.

IV. Preparation of Metal-cyano Bonded Phases

The metal cyano bonded phases can be prepared generally by treating a cyano modified substrate with a metal complex, e.g., by contacting with a solution comprising a metal complex. The cyano modified substrate can be prepared if necessary by chemically bonding a cyano containing moiety (e.g., a cyanohydrocarbyl group such as cyanopropyl or cyanoooctyl or the like) to a substrate. Alternatively, the substrate can comprise a cyano moiety and does not require that a chemical bonding step be performed to introduce the cyano moiety. For example, cyanopropyl bonded phases are readily available for purchase. In a further example, a cyano modified substrate can comprise a polymer formed from cyanosubstituted monomers, or the cyano groups can be chemically bonded to a polymer after polymerization (e.g., polystyrenedivinylbenzene substituted with cyanoalkyl groups). Thus, methods for preparing metal cyano bonded phases can involve first modifying or synthesizing the substrate to comprise cyano groups to which to coordinate the metal complex. The cyano modified substrate is then contacted with a metal complex to provide a metal cyano bonded phase.

Methods for preparing an inorganic substrate modified with a metal cyano bonded phase generally comprise either providing an inorganic substrate comprising a cyano bonded phase, or modifying an inorganic substrate with a suitable agent such as a cyanosilane to provide a cyano bonded phase. Then, the cyano bonded phase is contacted with a metal complex to provide a metal cyano bonded phase. The method can further comprise modifying the cyano bonded phase with an endcapping silane prior to contacting the cyano bonded phase with a metal complex.

In a preferred embodiment, the cyanosilane has the formula $NC-(CH_2)_\beta SiR_\alpha X_{(3-\alpha)}$, wherein R is a $C_1$-$C_{20}$ hydrocarbyl, α is 0-2, β is 1-100, and X is a leaving group, for example, Cl, Br, I, OH, alkoxy, acyloxy, and the like. Particular preferred silanes include monochloro-, trichloro-, monomethoxy-, or trimethoxysilanes. In a particularly preferred embodiment, the cyanosilane is 3-cyanopropyldimethylchlorosilane.

The preparation of a preferred embodiment of a cyano bonded phase is described in Example 1. Briefly, silica gel is allowed to dry (e.g., heating to 120° C. for 24 hours or allowed to equilibrate in a desiccator over a saturated aqueous solution of a salt, such as $MgCl_2$ or LiCl) and is then suspended in a suitable solvent (e.g., xylene) containing a base (e.g., pyridine and/or imidazole). An excess of cyano-substituted silane (e.g., 3-cyanopropyldimethylchlorosilane or other cyano-silane) is added, and the suspension is refluxed. The reaction product is filtered off by suction and washed with one or more suitable solvents, typically toluene, dichloromethane, methanol, a water-methanol mixture and finally with methanol. The resulting solid material is dried (e.g., 80° C. for 20 hours). A second silylation reaction can be performed using the cyano-bonded silica gel in place of silica gel to block unreacted silanols with endcapping reagents or to introduce additional functionalities into the bonded phase. For example, the cyano-bonded silica gel can be reacted with a suitable endcapping reagent, such as N,O-bis(trimethylsilyl)acetamide. A metal cyano bonded phase can then be generated by treating the modified silica with a solution comprising a metal complex, for example, by refluxing the cyano bonded phase with a solution of N,N'-bis(salicylidene)ethylenediaminocobalt (II) hydrate). The treated silica can be filtered and purified as desired, for example, by repeated washing with methanol, a water-methanol mixture, and finally with acetone, and drying prior to characterization or packing.

V. Applications

Applications of the metal cyano bonded phases include, but are not limited to, catalysis, adsorption, chromatographies, and sample preparation (e.g., solid phase extraction). The metal cyano bonded phases provide superior chromatographic behavior, especially when assessed by residual silanol activity and base deactivation.

The metal cyano bonded phases of the present invention can be used as a stationary phase for chromatographic applications, and can be used in a method for separating a plurality of analytes, comprising performing chromatographic separation using a stationary phase comprising a metal cyano bonded phase, such as the cyanocobalt bonded phase described in Example 1. The chromatographic separation can be performed using a mobile phase that is gaseous or liquid. In one embodiment, the mobile phase comprises from 0 to 100% water. For example, the chromatographic application or separation method can be thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, solid phase extraction separations, or monolith based separations, without limitation.

In a preferred embodiment, improved cyano bonded phases are provided for chromatography utilizing a silica gel substrate, the improvement being the introduction of a metal complex to form a metal cyano bonded phase. In particular embodiments, the silica gel substrate is equilibrated in an atmosphere having a defined relative humidity prior to performing a silanization reaction with a cyanosilane, and optionally an endcapping reagent. In a particular embodiment, the silica gel substrate is equilibrated in an atmosphere of 11% relative humidity.

The metal cyano bonded phases can also be utilized in capillary chromatography and microfluidics applications. The miniaturization of liquid separation techniques to the nano-scale involves small column internal diameters (<100 micron i.d.) and low mobile phase flow rates (<300 nL/min). Techniques such as capillary chromatography, capillary zone electrophoresis (CZE), nano-LC, open tubular liquid chromatography (OTLC), and capillary electrochromatography (CEC) offer numerous advantages over conventional scale high performance liquid chromatography (HPLC). These advantages include higher separation efficiencies, high-speed separations, analysis of low volume samples, and the coupling of 2-dimensional techniques.

Metal cyano bonded phases on inorganic substrates as described herein can provide superior chromatographic performance in these applications as well. For example, fused silica capillary tubing can be used as a stationary phase and modified to provide a metal cyano bonded phase as described above and used in capillary chromatography or capillary zone electrophoresus applications, for example. Fused silica tubing of dimensions 360 micron OD×250 micron ID (Polymicro Technologies, Phoenix, Ariz.) is suitable for preparing silane modified silica capillary tubing for microchromatographic or microfluidics applications.

Capillary electrochromatography is a hybrid technique that utilizes the electrically driven flow characteristics of electrophoretic separation methods within capillary columns packed with a solid stationary phase typical of liquid chromatography. It couples the separation power of reversed-phase liquid chromatography with the high efficiencies of capillary electrophoresis. Higher efficiencies are obtainable for capillary electrochromatography separations over liquid chromatography, because the flow profile resulting from electroosmotic flow is flat due to the reduction in frictional drag along the walls of the separation channel when compared to the parabolic flow profile resulting from pressure driven flows. Furthermore, smaller particle sizes can be used in capillary electrochromatography than in liquid chromatography, because no backpressure is generated by electroosmotic flow. Capillary electrochromatography is capable of separating neutral molecules due to analyte partitioning between the stationary and mobile phases of the column particles using a liquid chromatography separation mechanism. The metal cyano bonded phases described herein are also suitable for use in capillary electrochromatography, and similar techniques.

Microchip-based separation devices have been developed for rapid analysis of large numbers of samples. Compared to other conventional separation devices, these microchip-based separation devices have higher sample throughput, reduced sample and reagent consumption, and reduced chemical waste. The liquid flow rates for microchip-based separation devices range from approximately 1-300 nanoliters per minute for most applications. Examples of microchip-based separation devices include those for capillary electrophoresis, capillary electrochromatography and high-performance liquid chromatography. Such separation devices are capable of fast analyses and provide improved precision and reliability compared to other conventional analytical instruments. The metal cyano bonded phases described herein can be applied to microchip based separation devices as well.

Monolithic support structures (or posts) can be etched in a glass substrate using reactive ion etching techniques. Etching techniques are available to create glass substrate features in the range of 5 to 20 microns. Porous or nonporous particles can also be incorporated into microfluidics designs, providing particles within microchannels on microchip-based separation devices. Both porous and nonporous particles and monolithic structures can be advantageously modified using the metal cyano bonded phases as described herein for use in microfluidics applications.

VI. Chromatographic Performance

Basic compounds tend to tail on alkyl phases because of their interaction with acidic silanols on the silica surface. These silanol interactions can often cause increased retention but loss in performance (peak shape). The separation of mixtures of complex basic compounds, such as tricyclic antidepressants, is a good test for the presence of residual silanol activity that can affect chromatographic performance. Accordingly, the bonded phase prepared according to Example 1 was packed into a 0.46 centimeter diameter by 15 centimeter long stainless steel column. Mixtures of tricyclic antidepressants were used to test for residual silanol, and the results are shown in FIG. 1. The mixture of tricyclic antidepressants included: doxepin (peak 1), trimipramine (peak 2), amitriptyline (peak 3), imipramine (peak 4), desmethyldoxepin (peak 5), nortriptyline (peak 6), desipramine (peak 7) and protriptyline (peak 8). The column showed rapid separation with excellent peak shapes and remarkable selectivity. The total elution time was less than 4 minutes. The peaks show excellent resolution and separation with remarkably little separation time. Thus these results demonstrate the superior performance achieved only using a bonded phase of the present invention.

VII. Analytes

The analytes that can be separated using the metal cyano bonded phases described herein are not particularly limited and span a broad range of analytes using a wide range of separating conditions. For example, the metal cyano bonded phases are useful in both normal phase chromatography as well as reverse phase chromatography, and can be used advantageously with polar analytes as well as nonpolar analytes.

The metal cyano bonded phases are particularly useful in the separation of basic compounds, or more generally, analytes having an undesirable interaction with unmodified silanols. Preferable analytes include, but are not limited to, pharmaceutically active compounds (e.g., tricyclic antidepressants, β-blockers, etc.).

VIII. Advantages

The metal cyano bonded phases demonstrated unique selectivity, rapid separation capabilities, outstanding resolution for basic analytes, improved storage stability, and excellent stability at a pH between 1.5 and 7.5 mobile phase conditions for more than 2000 multiple injections. The metal cyano bonded phases resist phase collapse and extend the usefulness of cyano bonded phases significantly in allowing the cyano bonded phases to be used with a wider range of mobile phase conditions, such as varying aqueous/nonaqueous solvent proportions, and a wider useful pH range, for example.

It is to be understood that while the invention has been described in conjunction with the preferred specific embodiments thereof, that the description above as well as the examples that follow are intended to illustrate and not limit the scope of the invention. The practice of the present invention will employ, unless otherwise indicated, conventional techniques of organic chemistry, polymer chemistry, biochemistry and the like, which are within the skill of the art. Other aspects, advantages and modifications within the scope of the invention will be apparent to those skilled in the art to which the invention pertains. Such techniques are explained fully in the literature.

In the following examples, efforts have been made to ensure accuracy with respect to numbers used (e.g., amounts, temperature, etc.) but some experimental error and deviation should be accounted for. Unless indicated otherwise, temperature is in degrees ° C. and pressure is at or near atmospheric. All solvents were purchased as HPLC grade, and all reactions were routinely conducted under an inert atmosphere of argon unless otherwise indicated. Unless otherwise indicated, the reagents used were obtained from the following sources: All organic solvents were obtained from J. T. Baker (Phillipsburg, N.J., USA). Organic silane reagents were from Gelest (Tullytown, Pa., USA) or Silar Laboratories (Wilmington, N.C., USA). Silica gel and chemically bonded silica gel columns were obtained from Varian, Inc. (Lake Forest, Calif., USA). Liquid chromatography was performed using a model HP 1100 series from Agilent (Palo Alto, Calif., USA). Chemicals used were from Sigma-Aldrich, Inc. (Milwaukee, Wis., USA). HPLC grade acetonitrile, methanol and water were from VWR Scientific Products (San Dimas, Calif., USA).

Abbreviations:
k retention factor, $k=(t_R-t_0)/t_0$
$t_R$ retention time of the measured peak
$t_0$ retention time of the non-retained component.
mL milliliter

EXAMPLE 1

Preparation of a Cyanocobalt Bonded Phase

Silica gel was allowed to dry at 120° C. for 24 hours or was equilibrated in a desiccator for three weeks over a saturated aqueous solution of lithium chloride. Silica gel was then suspended in a mixture of xylene, pyridine, imidazole and an excess of 3-cyanopropyldimethylchlorosilane was added. The suspension was refluxed for 24 hours, and the reaction product was filtered off by suction and washed with toluene, methanol, a water-methanol mixture and finally with methanol. The resulting solid material was dried at 80° C. for 20 hours. A second silylation reaction was performed as described above using the cyanopropyl-bonded silica gel in place of silica gel. In the second silylation procedure, the cyanopropyl-bonded silica gel and N,O-bis(trimethylsilyl) acetamide and xylene were refluxed for 24 hours. The modified silica was then treated with a solution of N,N'-bis(salicylidene)ethylenediaminocobalt (II) hydrate. After the mixture was refluxed for 24 hours, the silica was filtered and purified by repeated washing with methanol, a water-methanol mixture, and finally with acetone. The material was dried at 80° C. for 20 hours prior to characterization or packing.

EXAMPLE 2

Chromatographic Performance of a Cyanocobalt Bonded Phase

The metal cyano bonded phase prepared in Example 1 was packed into a 0.46 centimeter diameter by 15 centimeter long stainless steel column and tested for its ability to separate basic compounds, a complex mixture of tricyclic antidepressants. A typical liquid chromatogram obtained and is shown in FIG. 1, showing the elution of analytes: doxepin (peak 1), trimipramine (peak 2), amitriptyline (peak 3), imipramine (peak 4), desmethyldoxepin (peak 5), nortriptyline (peak 6), desipramine (peak 7) and protriptyline (peak 8) using a mixture of acetonitrile, methanol and phosphate buffer at pH 7.0 as the mobile phase at 2.0 mL/min flow rate.

The column demonstrated rapid separation (less than 4 minutes) with excellent peak shapes and remarkable selectivity. The peaks show excellent resolution and separation with remarkably little separation time.

EXAMPLE 3

Comparative Chromatographic Performance of a Cyanocobalt Bonded Phase

Figure 2:
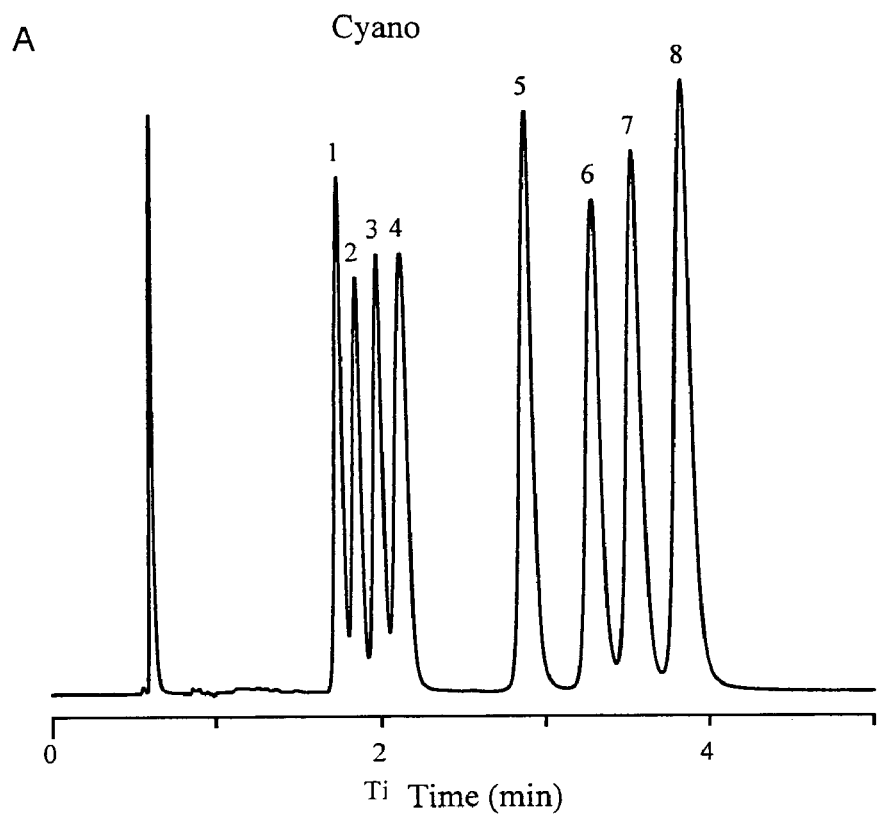
FIG. 2 shows the superior resolution achieved only using a metal-cyano bonded phase of the present invention.
Figure 2:
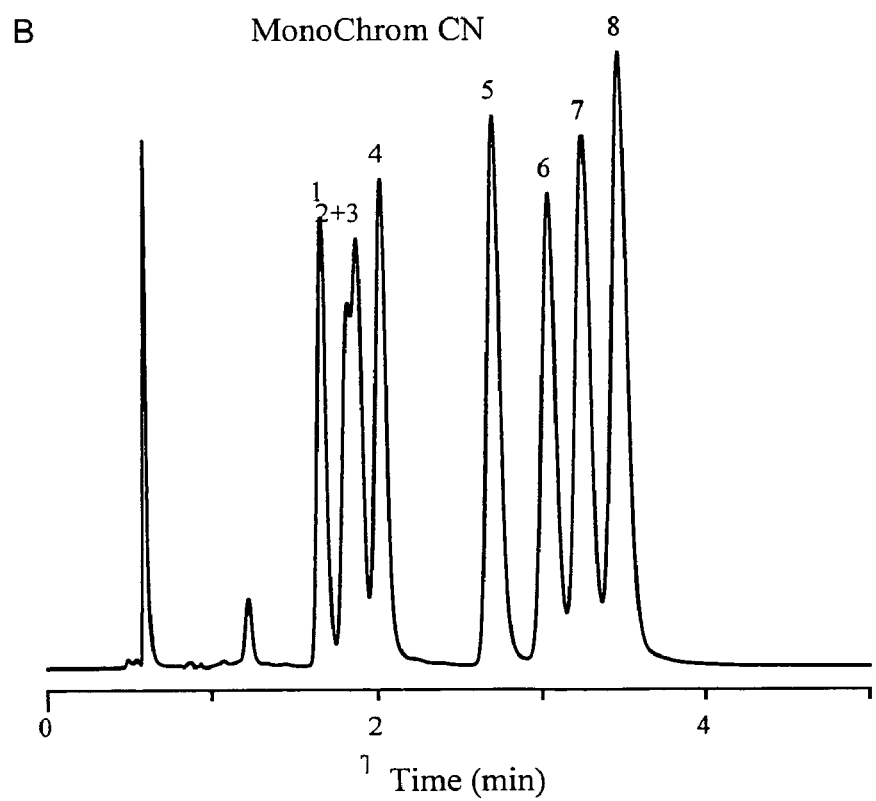
Figure 2:
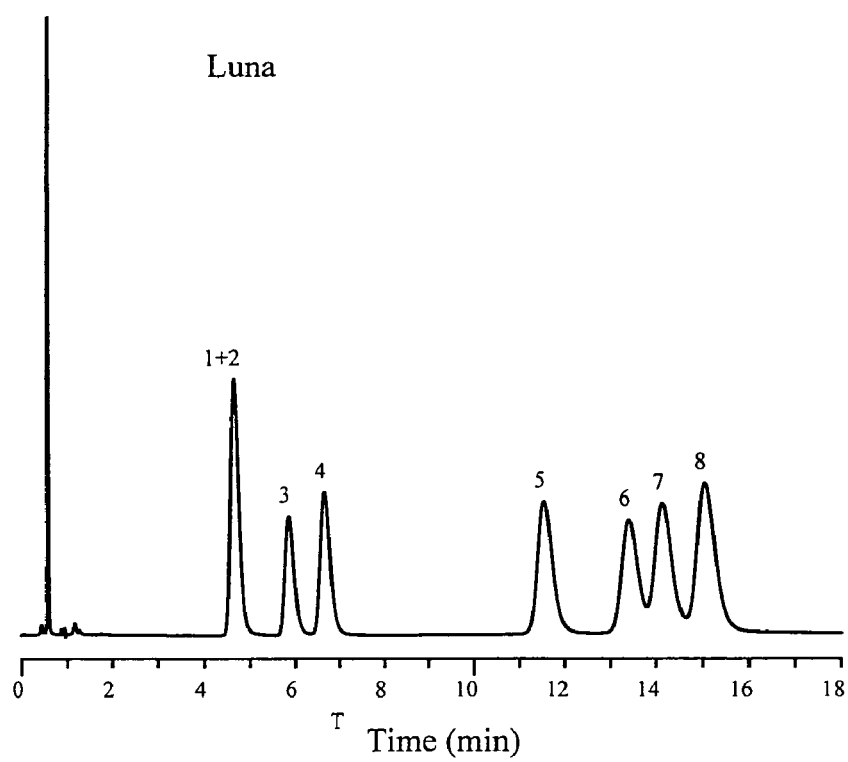
Figure 2:
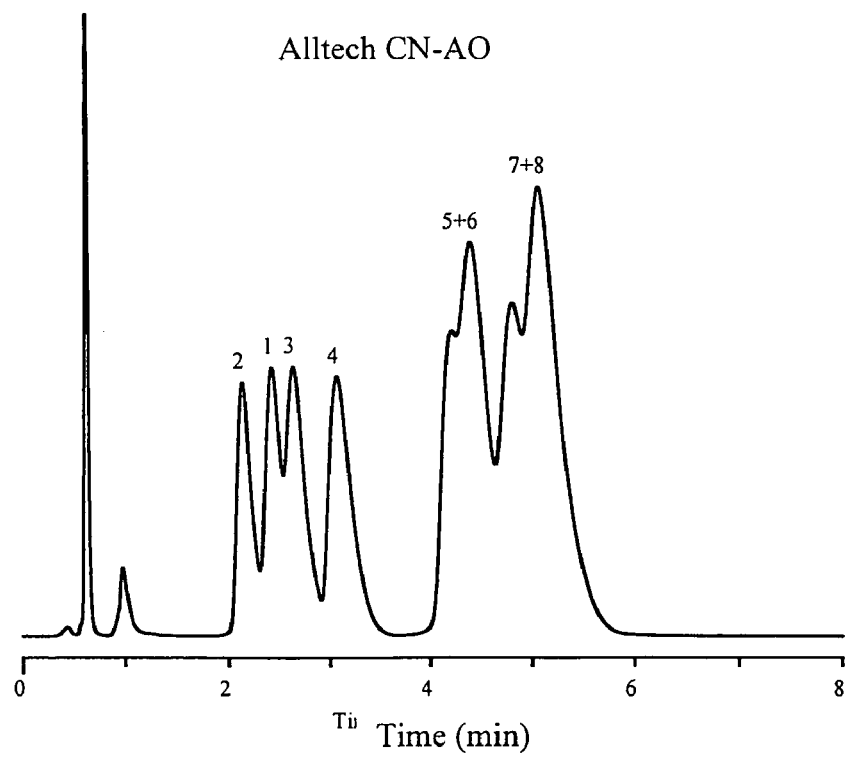

A comparison was performed using three other cyano columns, MonoChrom CN® (Varian, Inc., Palo Alto, Calif.), Luna CN® (Phenomenex, Inc., Torrance, Calif.), and Alltech CN-AQ (Alltech Associates, Inc., Deerfield, Ill.). Separation of the same mixture of tricyclic antidepressants was evaluated using each column in the same conditions as example 2. The results are shown in FIG. 2A-D. As is shown in FIG. 2A, excellent and rapid separation was achieved between the mixture of tricyclic antidepressants. The sharply eluting bands demonstrate the superior ability of this embodiment of the bonded phase of the present invention to separate basic compounds. In contrast, the separation of these compounds was not possible on other columns under these elution conditions. FIG. 2B demonstrates that there was poor resolution between peaks 2 and 3. FIG. 2C demonstrates that there was poor resolution between peaks 1 and 2. FIG. 2D demonstrates that there was poor resolution between peaks 5 and 6 and between peaks 7 and 8. Thus, the comparison experiment demonstrates that superior chromatographic performance is only achieved using the bonded phase of Example 1. Thus the metal-cyano bonded phases represent a major advance in the art of separations.

EXAMPLE 4

A Cyanocobalt Bonded Phase Provides Superior Inertness and Chemical Stability

Figure 3:
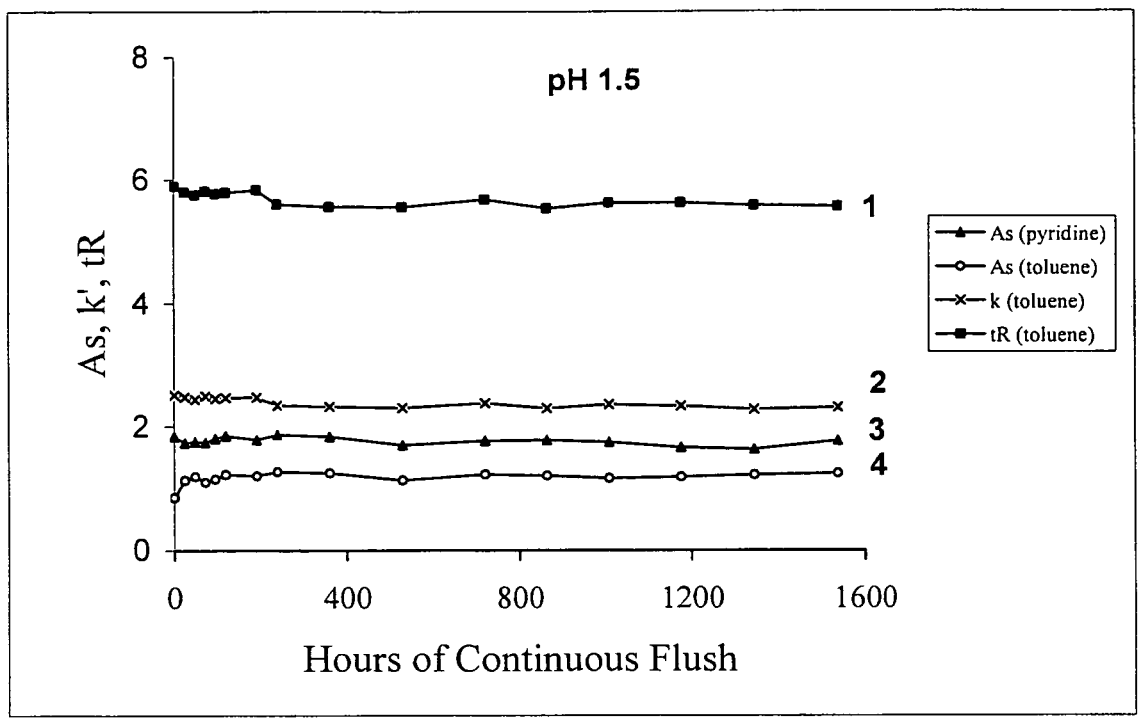
FIG. 3 shows the chemical stability to both pH 1.5 and pH 7.5 of a metal-cyano bonded phase of the present invention.
Figure 3:
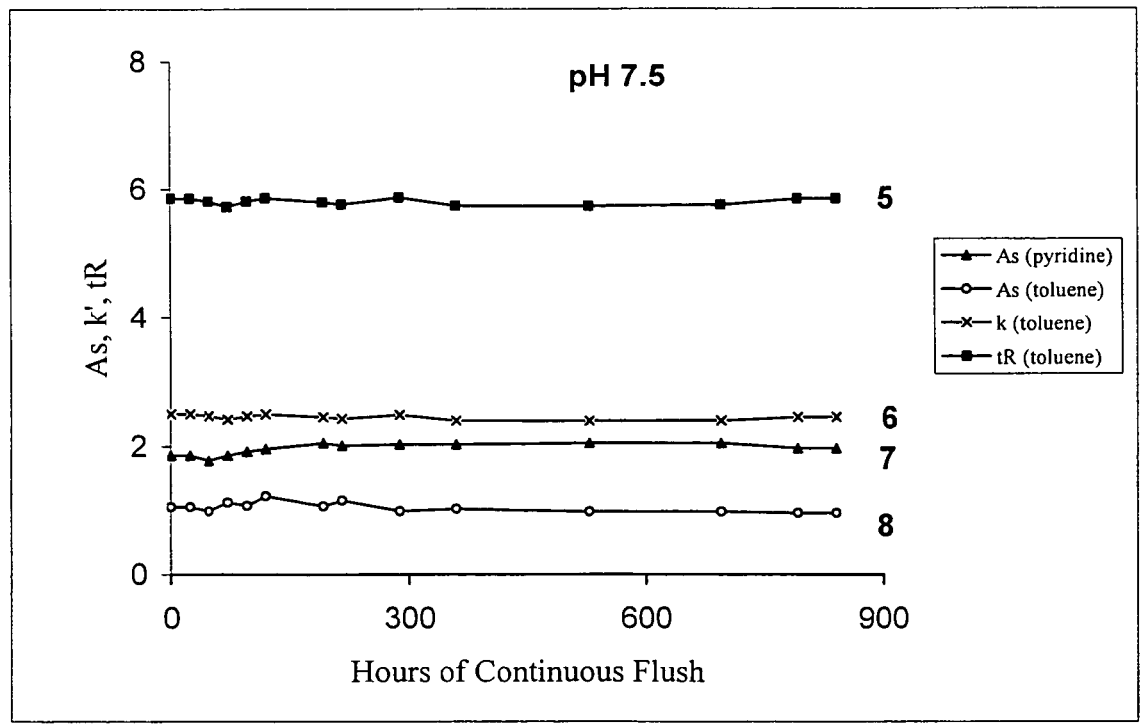

The inertness and the chemical stability of the bonded phase of the present invention were investigated by looking at the pH stability, multiple injections and storage stability. The column was continuously flushed at both pH 1.5 and pH 7.5. The column stability was evaluated by making injections of a 4-component test mixture using a pH 7.0 mobile phase. The results are shown in FIGS. 3A and B. The virtually horizontal plots testify to the reproducibility of retention and asymmetry as well as to the stability of the column under acidic and basic conditions. FIG. 3A shows chemical stability of the bonded phase of the present invention to pH 1.5 and FIG. 3B shows the chemical stability of the bonded phase to pH 7.5. Lines numbered 1 and 5 indicate the retention time observed for toluene, and lines numbered 2 and 6 represent the retention factors for toluene. Lines numbered 3 and 7 indicate the peak asymmetry observed for pyridine, and lines numbered 4 and 8 indicate the peak asymmetry for toluene. As shown in FIGS. 3A and B, the retention time, retention factor and asymmetry for toluene and pyridine were almost constant in continuous operation for more than 800 hours in both a 1% trifluoroacetic acid (pH 1.5) solution and in 20 mM phosphate buffer (pH 7.5) solution, indicating excellent stability.

EXAMPLE 5

A Cyanocobalt Bonded Phase Provides Superior Reproducibility

Figure 4:
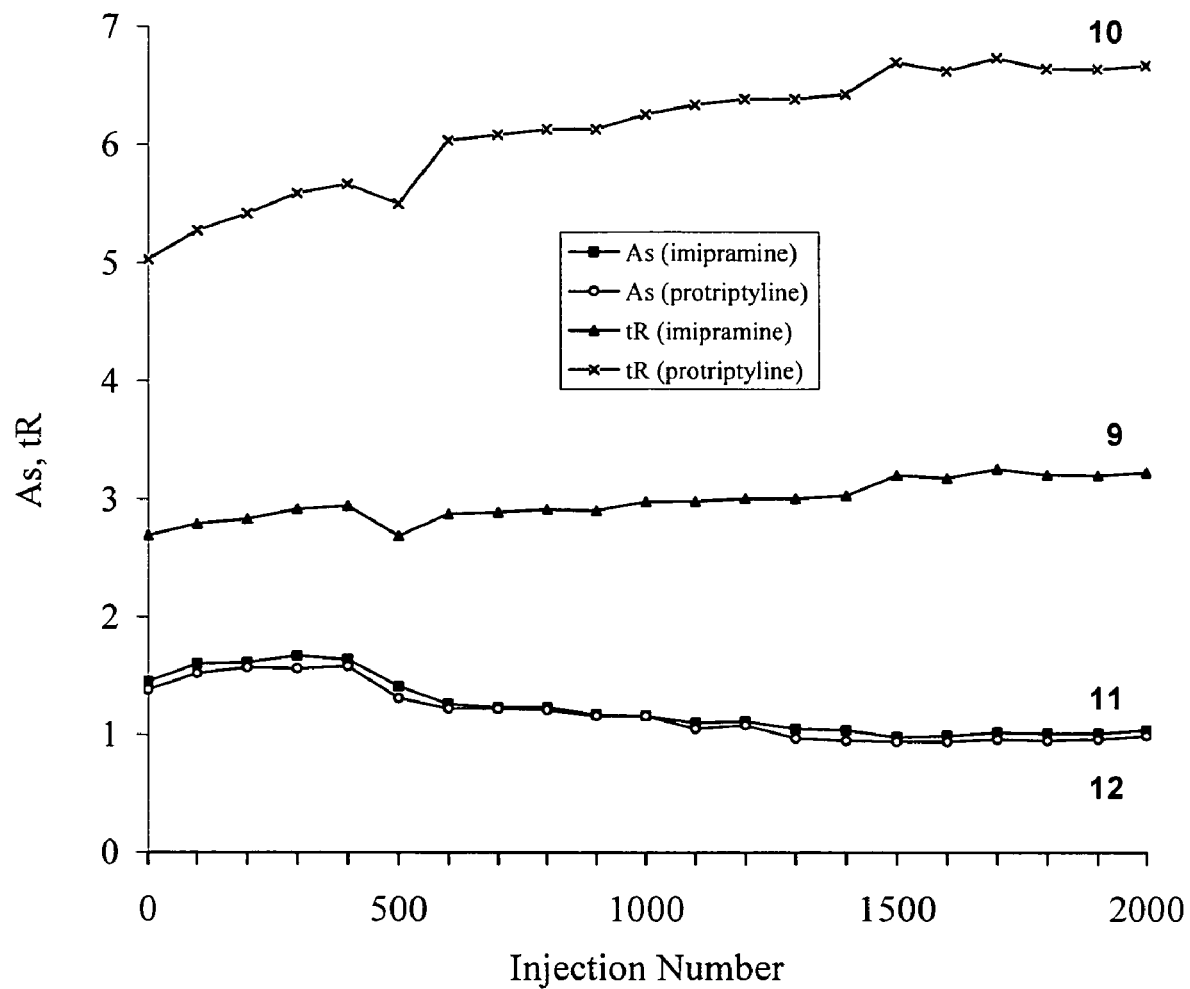
FIG. 4 demonstrates the superior chromatographic reproducibility achieved by the metal-cyano bonded phase of the present invention.

The column was also tested for stability by repeated injection (2000 injections) of the tricyclic antidepressants mixture of Example 1. Representative data points are shown in FIG. 4. Line 9 indicates the retention time observed for imipramine, line 10 represents the retention time observed for protriptyline, line 11 indicates the peak asymmetry observed for imipramine, and line 12 indicates the peak asymmetry observed for protriptyline.

EXAMPLE 6

A Cyanocobalt Bonded Phase Provides Superior Storage Stability

Figure 5:
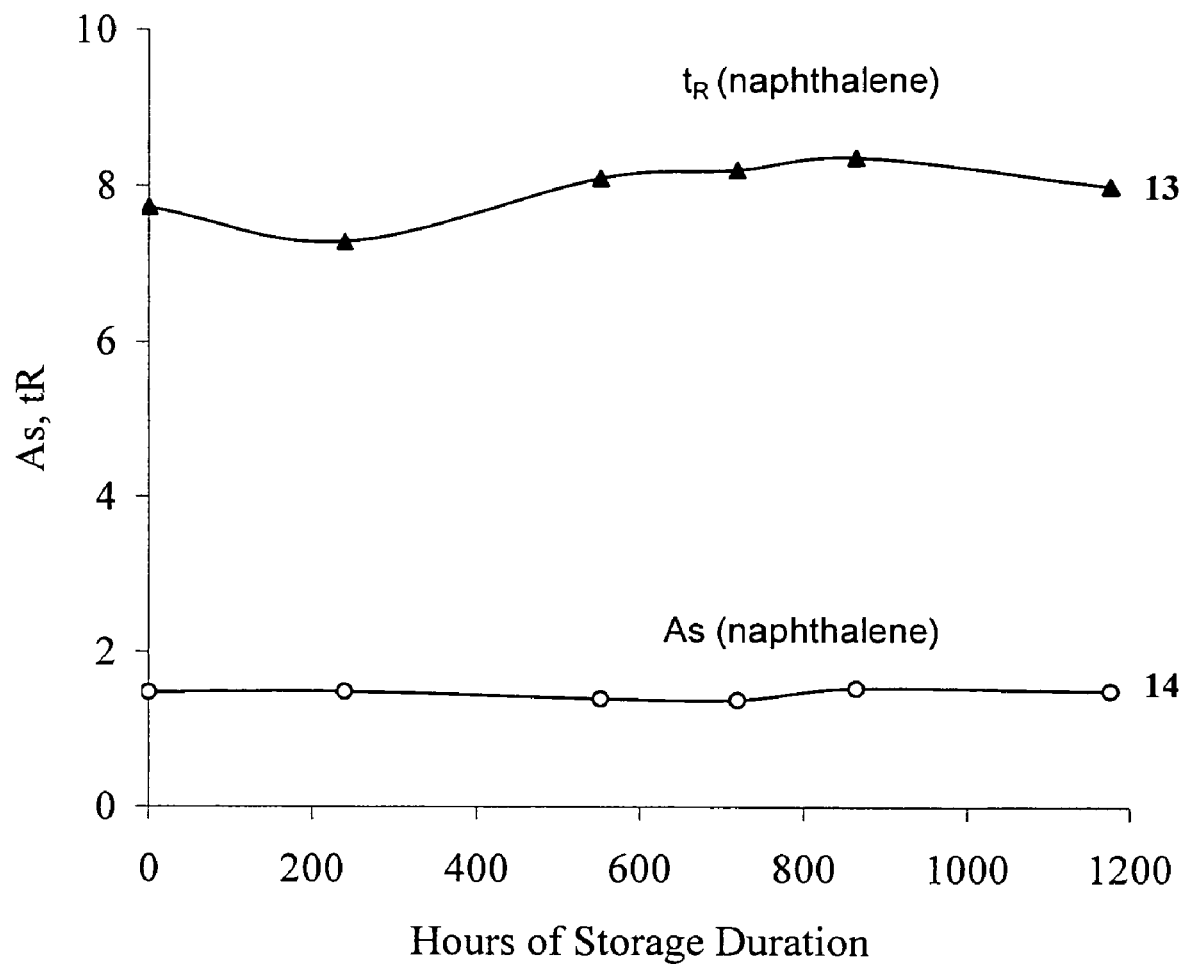
FIG. 5 demonstrates the superior storage stability achieved by the metal-cyano bonded phase of the present invention.

The column was further tested by the stop-flow HPLC method. The packing material of the present invention was immersed in a mobile phase of 40:60 acetonitrile:water without flow and tested at regular intervals for retention and asymmetry characteristics of naphthalene. The results are shown in FIG. 5. Line 13 shows the retention time for naphthalene, and line 14 shows the peak asymmetry for naphthalene. As shown in FIG. 5, a variation of less than 5% in retention time and asymmetry of naphthalene was observed after 30 days, indicating the improved storage stability. In addition, no column void was observed.

What is claimed:

1. A composition for use in chromatography comprising a substrate modified with a metal cyano bonded phase comprising a cyanohydrocarbyl moiety, wherein the metal cyano bonded phase comprises a metal complex comprising a metal and at least one polydentate ligand or monodentate ligand, or combinations thereof.

2. The composition of claim 1, wherein the metal is selected from a transition metal, an actinide or a lanthanide.

3. The composition of claim 2, wherein the transition metal is selected from Cu, Co, Fe, Mn, Cr, Ni, Zn, or Ti, or combinations thereof.

4. The composition of claim 1, wherein the polydentate ligand is selected from a Schiff base, or a macrocyclic ligand.

5. The composition of claim 4, wherein the Schiff base is bis(salicylidene)-ethylenediamine.

6. The composition of claim 1, wherein the substrate is an inorganic substrate or an organic substrate, or mixtures or composites thereof.

7. The composition of claim 6, wherein the inorganic substrate comprises a metal or metalloid oxide, or mixtures or composites thereof.

8. The composition of claim 7, wherein the metal or metalloid oxide is selected from silica, alumina, zeolite, mullite, zirconia, vanadia or titania, or mixtures or composites thereof.

9. The composition of claim 1, wherein the metal cyano bonded phase comprises a cyanohydrocarbyl moiety having the formula NC—$(CH_2)_\beta SiR_\alpha$, wherein R is a $C_1C_{20}$ hydrocarbyl, $\alpha$ is 0-2, and $\beta$ is 1-100.

10. A method for separating a plurality of analytes, comprising performing a chromatographic separation using a stationary phase comprising a substrate modified with a metal cyano bonded phase comprising a cyanohydrocarbyl moiety, wherein the metal cyano bonded phase comprises a metal complex comprising a metal and at least one polydentate ligand or monodentate ligand, or combinations thereof.

11. The method of claim 10, wherein the substrate is an inorganic substrate or an organic substrate, or mixtures or composites thereof.

12. The method of claim 11, wherein the inorganic substrate comprises a metal or metal joid oxide, or mixtures or composites thereof.

13. The method of claim 10, wherein the chromatographic separation is thin layer chromatography, high performance liquid chromatography, reversed phase chromatography, normal phase chromatography, ion chromatography, ion pair chromatography, reverse phase ion pair chromatography, ion exchange chromatography, affinity chromatography: hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography, mass spectrometry, gas chromatography, microfluidics based separations, solid phase extraction separations, or monolith based separations.

14. A chromatography column wherein the stationary phase comprises the modified substrate of claim 1.

15. The composition of claim 1, wherein the cyanohydrocarbyl moiety comprises a $C_{1-100}$ straight or branched chain hydrocarbyl including cycloalkvl, cycloalkylalkyl, or heterocycloalkyl substituted with at least one cyano moiety, and optionally further substituted with $C_1$-$C_{20}$ hydrocarbyl, hydroxyl, alkoxy, halogen amino, or caibonyl.

16. The method of claim 10, wherein the cyanohydrocarbyl moiety comprises a $C_{1-100}$ straight or branched chain hydrocarbyl, including cycloalkyl, cycloalkylalkyl, or heterocycloalkyl substituted with at least one cyano moiety, and optionally further substituted with $C_1$-$C_{20}$ hydrocarbyl, hydroxyl, alkoxy, halogen, amino, or carbonyl.

* * * * *